(No Model.) 5 Sheets—Sheet 1.

F. A. JONES.
RECORDING PRESSURE GAGE.

No. 348,219. Patented Aug. 31, 1886.

Figure 1:
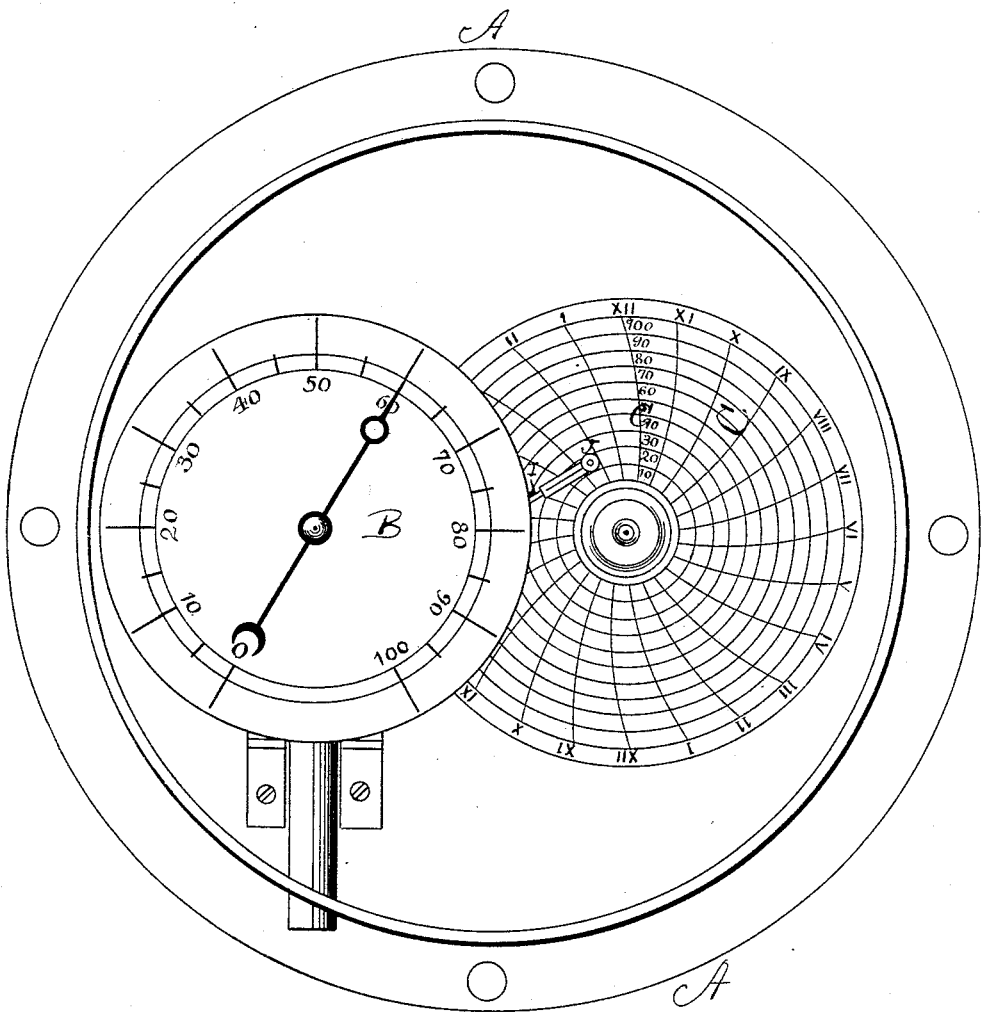

WITNESSES.   Fig. 1.   INVENTOR.

Joseph Ashbaugh
J. M. Hartnett.

Valentine A. Jones,
By his Atty.
Henry W. Williams (No Model.) 5 Sheets—Sheet 2.

F. A. JONES.
RECORDING PRESSURE GAGE.

No. 348,219. Patented Aug. 31, 1886.

WITNESSES.
Joseph Ishbaugh.
J. M. Hartnett.

INVENTOR.
Florentine A. Jones,
By his Atty.
Henry W. Williams.

(No Model.) 5 Sheets—Sheet 3.

F. A. JONES.
RECORDING PRESSURE GAGE.

No. 348,219. Patented Aug. 31, 1886.

WITNESSES.
Joseph Ishbaugh
J. H. Hartnett

INVENTOR.
Florentine A. Jones
By his Att'y.
Henry W. Williams (No Model.)

5 Sheets—Sheet 5.

F. A. JONES.
RECORDING PRESSURE GAGE.

No. 348,219. Patented Aug. 31, 1886.

WITNESSES.
Joseph Ashbaugh
J. M. Hartnett

INVENTOR.
Florentine A. Jones,
By his Atty.
Henry W. Williams

UNITED STATES PATENT OFFICE.

FLORENTINE A. JONES, OF MALDEN, MASSACHUSETTS.

RECORDING PRESSURE-GAGE.

SPECIFICATION forming part of Letters Patent No. 348,219, dated August 31, 1886.

Application filed February 25, 1884. Serial No. 121,911. (No model.)

*To all whom it may concern:*

Be it known that I, FLORENTINE A. JONES, of Malden, in the county of Middlesex and State of Massachusetts, have invented new and useful Improvements in Recording Pressure-Gages, of which the following is a specification.

This invention relates to gages for showing the extent and variations of pressure in steam boilers, cylinders, or other vessels containing air, gas, liquid, or other fluids, and is an improvement on the invention for which Letters Patent No. 287,684, dated October 30, 1883, were granted to myself and one Sylvester Glines, and Letters Patent No. 287,685, of same date, were granted to myself.

The object of this invention is to provide a more convenient and a simpler form of construction, and while conserving the required size of both the indicating and recording surfaces, yet to bring them within a form and size to adapt them for special usage, as often required, and which has never before, within my knowledge, been done by the use of the Bourdon spring or springs.

Figure 2:
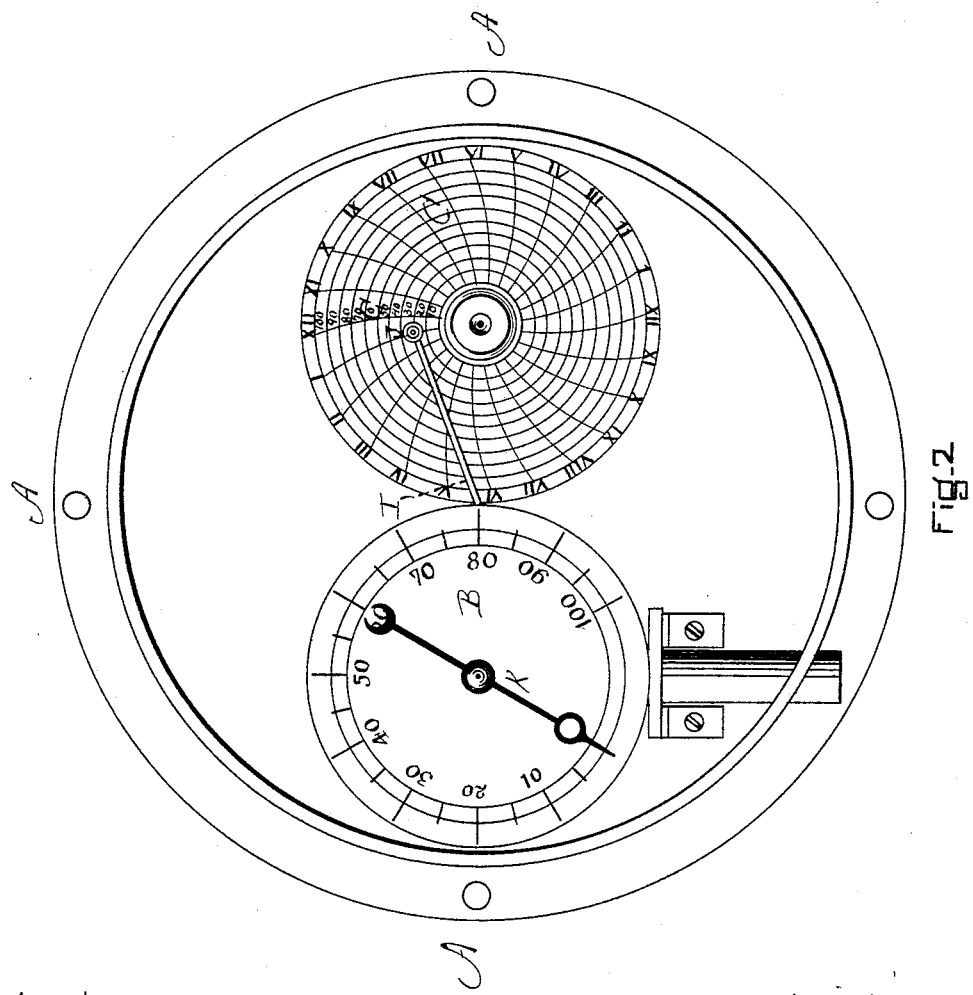
Figure 3:
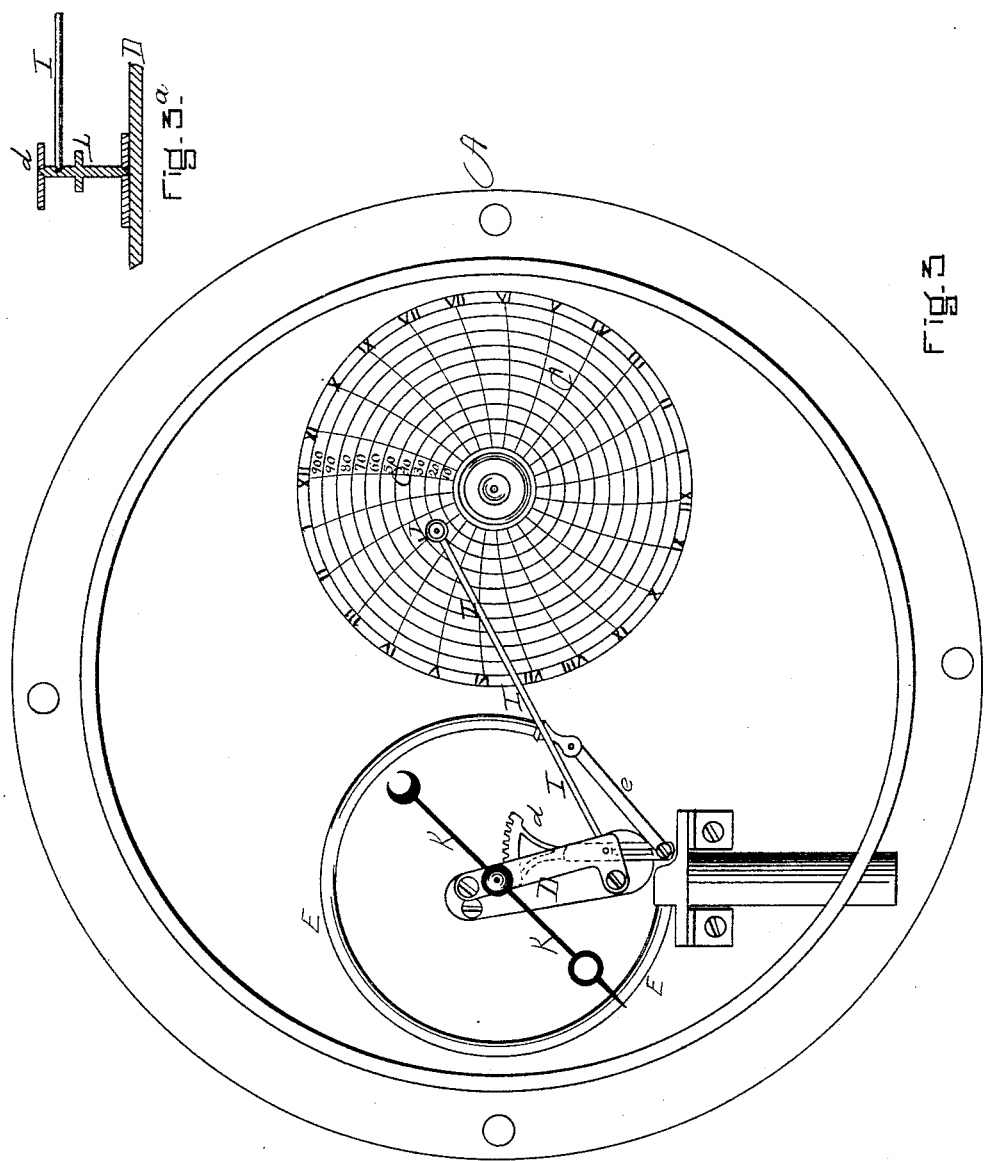
Figure 4:
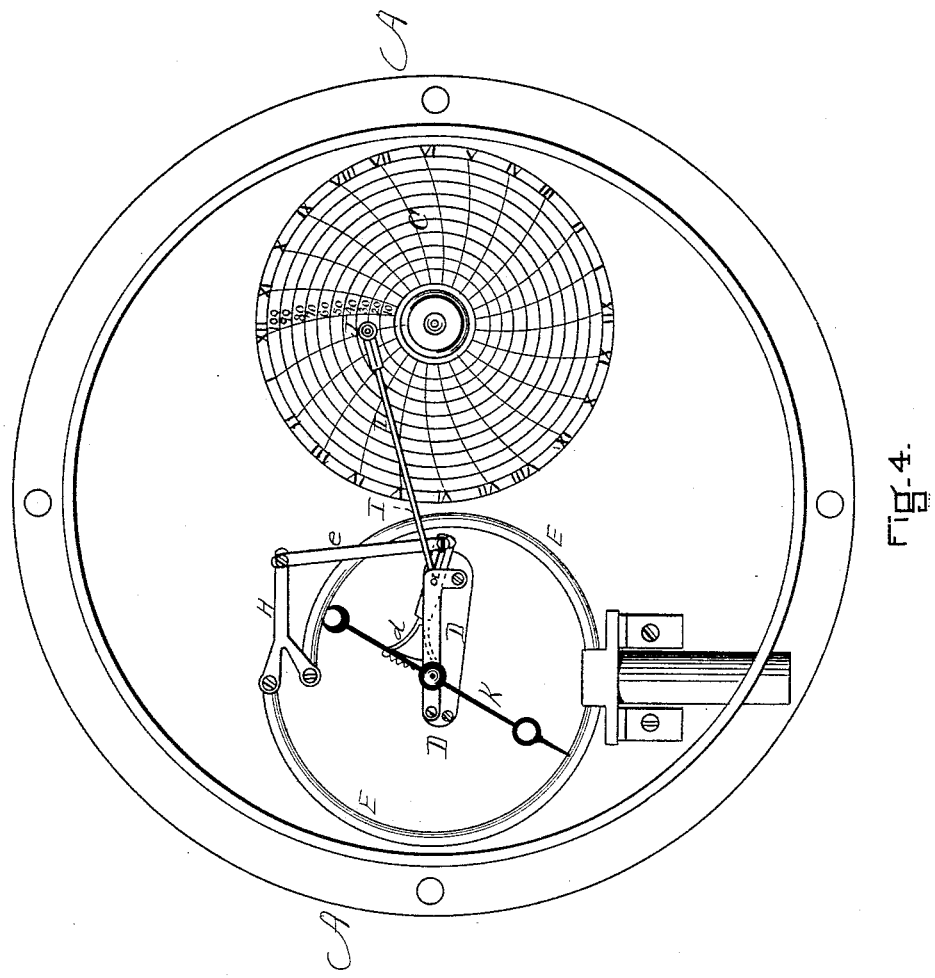
Figure 5:
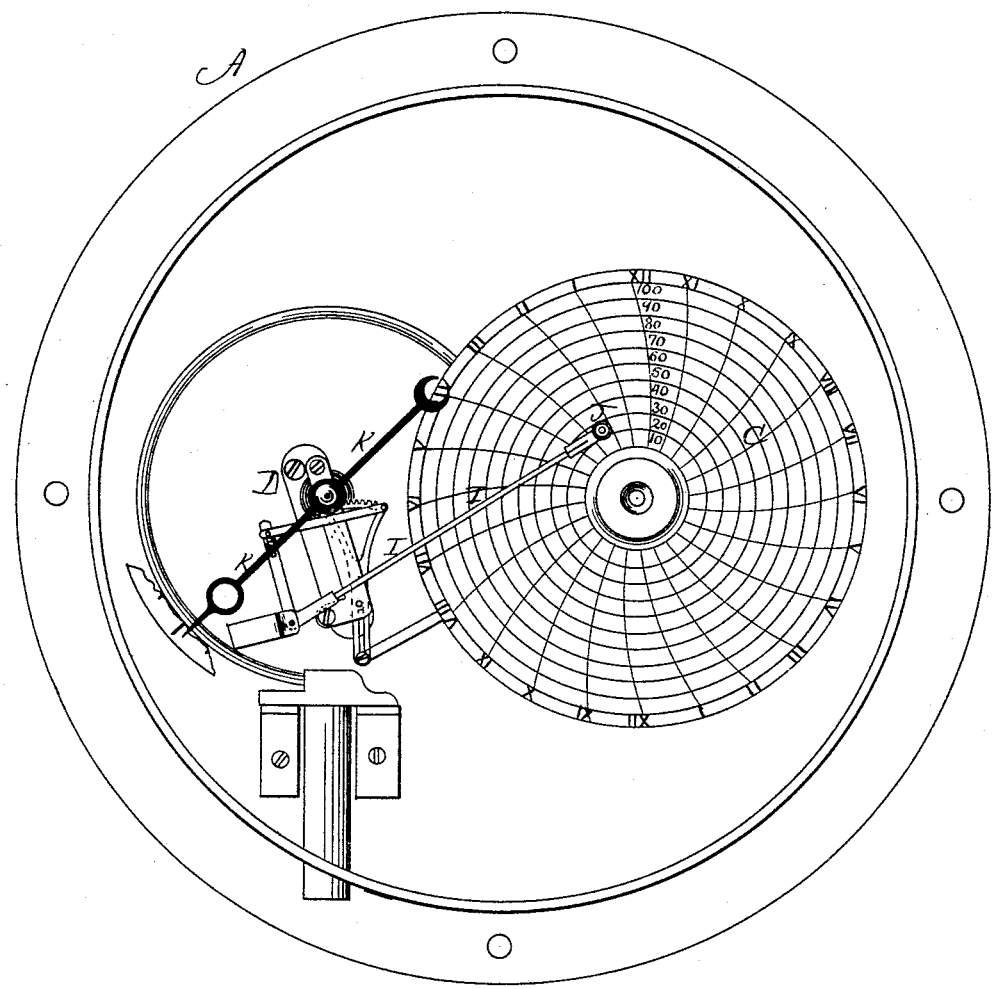

In the accompanying drawings, in which similar letters of reference indicate like parts, Figure 1 is a plan view of a recording pressure-gage embodying my improvements, showing a steam-pressure dial and a recording pressure-dial, one slightly overlapping the other. Fig. 2 is a plan view showing the dials placed side by side. Fig. 3 is a plan view with the steam-pressure dial removed, a single Bourdon spring being employed. Fig. 3ª is a detail view of the rack-post and its immediate connections. Fig. 4 is a plan view with the steam-pressure dial removed, a double Bourdon spring being employed. Fig. 5 is a plan view with the steam-pressure dial removed, the gage being so constructed that one of the dials will overlap the other, and the mechanism being somewhat different from that shown in the former figures.

A is a substantially circular box, of sufficient size to allow the steam-pressure mechanism situated under the steam-pressure dial B and the clock-work mechanism situated under the recording pressure-dial C to be placed side by side therein. In Figs. 2, 3, and 4 the said box is sufficiently large to allow the steam-pressure dial and the recording pressure-dial to be placed side by side. In Figs. 1 and 5, while the two mechanisms are still side by side, one of the dials slightly overlaps the other, thus permitting the use of a somewhat smaller box. In all the figures, however, the two mechanisms—that is to say, that under the steam-pressure dial and that under the recording pressure-dial—are side by side. This box A takes the place of the two boxes or double centrally-partitioned box ordinarily used, an illustration of which can be seen in one of the Letters Patent granted to me October 30, 1883.

My present box A is entirely without partitions, and is substantially of the shape shown.

D is the ordinary mechanism of a steam-gage, (see Figs. 3 and 4,) *d* being the segmental rack meshing into a pinion (not shown in the drawings) carrying the pointer K.

E is the Bourdon spring, (single in Fig. 3 and double in Fig. 4,) and *e* the link connecting the rear end of the rack with the free end of the Bourdon spring in Fig. 3, and with the bifurcated projection H rigidly secured to the ends of the double Bourdon spring in Fig. 4, all substantially as usual.

I is a rod which operates the delineating device J, whereby the extent and variations of pressure are recorded on the dial C, which is rotated by the ordinary clock-work mechanism. The spring E is a hollow tube, into which the pressure enters in the usual manner and acts upon its inner surface, causing said spring to expand and contract as the pressure increases or diminishes, thereby imparting, by means of the link *e*, rotary movement to the rack-post L, which causes the rod I to raise and lower the delineating device J upon the recording surface or dial C. The end of the rod I is rigidly secured to the rack-post L, (see Fig. 3ª,) said rack-post being rigidly secured to the rack *d*, so as to be rotated on its axis by said rack. Thus the movement of the Bourdon spring or springs produces, by means of the mechanism shown, rotary movement in the rack-post, and hence movement to the delineating device J, correspondingly greater in proportion to the length of the rod I.

Having thus fully described my invention, what I claim, and desire to secure by Letters Patent, is—

In a recording pressure-gage, the combination, with the recording-surface, the rack $d$, and a rack-post rigidly secured thereto, of a rod extending directly from said rack-post and operating a device for recording the extent and variations of pressure, substantially as and for the purpose set forth.

FLORENTINE A. JONES.

Witnesses:
HENRY W. WILLIAMS,
JOSEPH ISHBAUGH.